T. HEINZERLING.
RIM FOR VEHICLE WHEELS AND MEANS FOR SECURING THEM.
APPLICATION FILED JUNE 7, 1916.
1,238,766.
Patented Sept. 4, 1917.
2 SHEETS—SHEET 1.
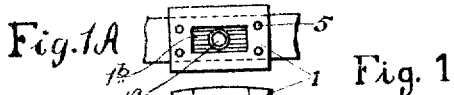
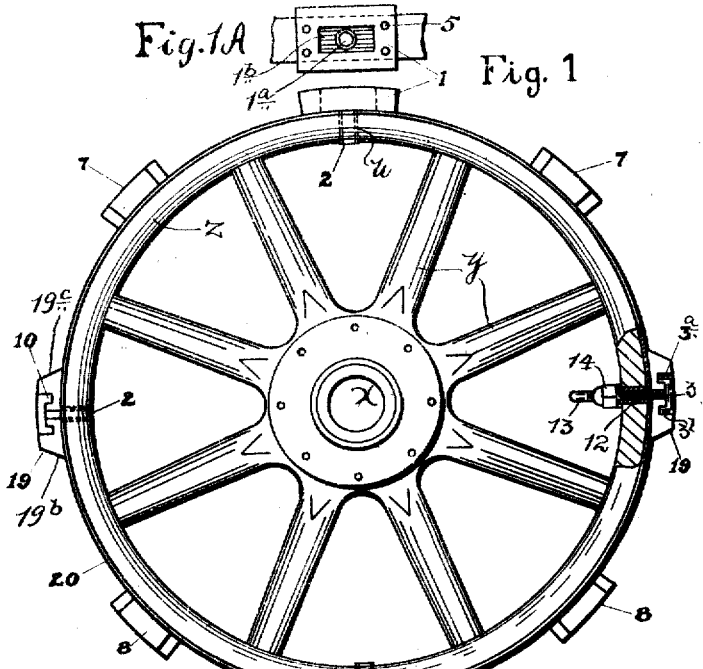
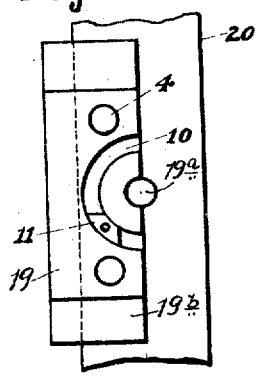
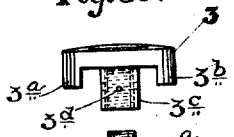
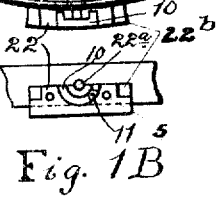
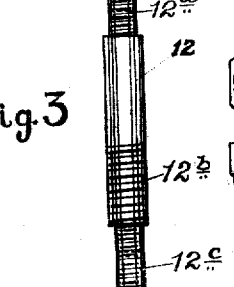
WITNESSES:
INVENTOR.
Theodore Heinzerling
BY
ATTORNEY T. HEINZERLING.
RIM FOR VEHICLE WHEELS AND MEANS FOR SECURING THEM.
APPLICATION FILED JUNE 7, 1916.
1,238,766.
Patented Sept. 4, 1917
2 SHEETS—SHEET 2.
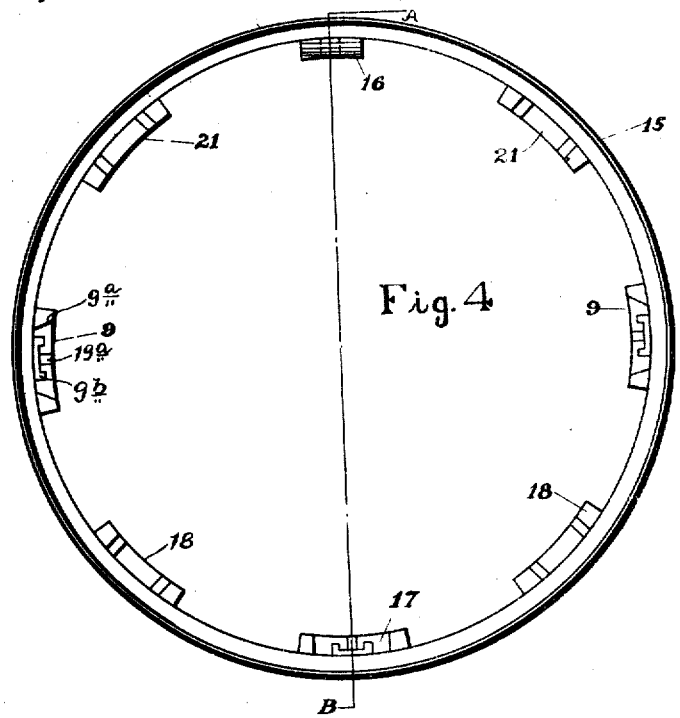
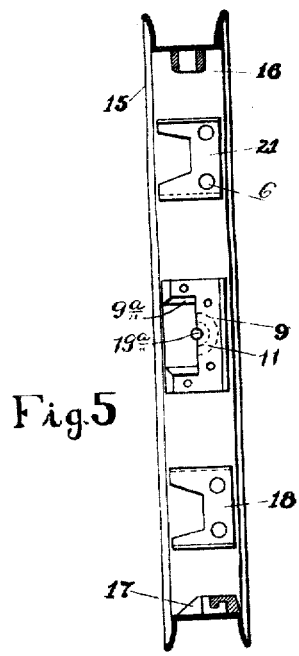
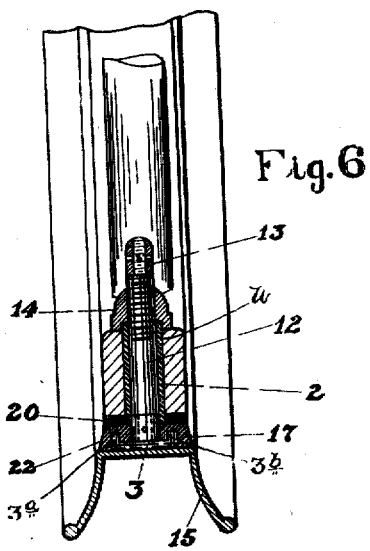
WITNESSES
INVENTOR.
Theodore Heinzerling
BY
ATTORNEY

UNITED STATES PATENT OFFICE.

THEODORE HEINZERLING, OF BROOKLYN, NEW YORK.

RIM FOR VEHICLE-WHEELS AND MEANS FOR SECURING IT.

1,238,766.   Specification of Letters Patent.   Patented Sept. 4, 1917.

Application filed June 7, 1916. Serial No. 102,121.

*To all whom it may concern:*

Be it known that I, THEODORE HEINZERLING, a citizen of the United States, and resident of the borough of Brooklyn, county of Kings, city and State of New York, have invented certain new and useful Improvements in Rims for Vehicle-Wheels and Means for Securing Them, of which the following is a specification.

The device, the subject of this invention, is of the general class, some times termed "demountable rims", and has for its principal objects the production of a rim, simple in construction, and yet highly efficient and one that may be secured in position or removed with but the slightest difficulty.

It will be noted that my rim is secured by a means different from the ordinary wedges, and that the securing means tends to draw the removable rim into more firm engagement with the body of the wheel, drawing it toward the axial center of the wheel and causing it to impinge and to be secured upon supports which are of themselves secured pre-determined distances from the center of the wheel.

This construction of a wheel and rim cause the rim to more surely assume the shape of a perfect circle, and there is little chance that even though the rim be carelessly applied that it will be out of round when in operable position.

I eliminate the common type of wedge with its numerous fastenings, and I substitute therefor certain locks and the keys securing tension of which is pre-determined to an extent that will prevent distortion or freezing of the parts and by means of the locks and keys, I also provide very efficient means for preventing a peripheral movement of the rim or a creaking of the tire.

Further advantages and the details of my construction will be fully set forth as the specification progresses.

The following is what I consider a good means of carrying out this invention and the accompanying drawings should be considered in view of the specification which follows.

In the drawings—

Figure 1 is a side elevation of a wheel with the rim omitted.

Fig. 1$^A$ is a plan view of a block.

Fig. 1$^B$ is a plan view of another block.

Fig. 2 is a plan view of one of the locking blocks.

Fig. 3 an elevation of a lock operating stud.

Fig. 3$^A$ a side elevation of a lock.

Fig. 3$^B$ an end elevation of a lock.

Fig. 3$^C$ a bottom plan view of an acorn nut.

Fig. 3$^D$ a side elevation thereof.

Fig. 3$^E$ an elevation of an operating key.

Fig. 3$^F$ an elevation of an operating key taken at right angles to Fig. 3$^E$.

Fig. 4 shows in elevation the removable rim.

Fig. 5 is a section thereof, the section being taken on the line A—B in Fig. 4.

Fig. 6 is an enlarged partially sectional and fractured view of an assembled wheel.

Similar reference numerals indicate like parts in all of the figures where they appear.

The body portion of my wheel may be of ordinary construction, size and design, and will have a hub X, spokes Y, radiating therefrom and a wooden felly Z, secured to the spokes. The size of the hub and the number of the spokes, and the diameter of the felly may be changed or varied at will and it is not even necessary that they should be of standard design to operate efficiently and satisfactorily with my device.

Secured upon the periphery of the felly is a metallic rim 20, a carrier for the reinforcing blocks and a part of the locking means as to be later described.

As customary, the secured rim 20, and felly Z, are provided with a perforation W, through which the valve stem will pass and adjacent to this perforation and secured to the rim 20, by means of suitable rivets 5, is a block 1, having a central perforation 1$^a$, and an aperture 1$^b$.

Extending through the perforation W, and preferably secured to the block 1, is a thimble 2, which may be terminated exterior to the inner periphery of the felly Z, and which will receive the pressure of a nut to be later described.

At equal distances around the periphery of the rim 20, I space locking members a portion of each of which is secured to the rim 20, and as shown in the drawings, I may provide four such locking members spacing them on the quarterings of the periphery of the rim.

For a purpose that shall be later described these locking members are not of the same construction, but the two opposed are similar, and I have therefore indicated them with the same reference characters 19 and 19, which characters indicate blocks secured in position by means of rivets 4. Each of these blocks is provided with a semi-circular key way 10, and a perforation 19ᵃ, and the sides of each of these blocks are cut at an angle as shown at 19ᵇ, and 19ᶜ.

The block 22, which is secured directly opposite the valve stem block 1, is also provided with a key way 10, and in each of the key ways I arrange a stop 11. The block 22, is also provided with a portion of a perforation 22ᵃ, but the sides of this block are not tapered, but are rather recessed as shown at 22ᵇ.

In each of the blocks 19,and 22, and passing through the perforations 19ᵃ and 22ᵃ, I arrange a locking key shown at 3, in Figs. 3ᴬ and 3ᴮ. This key has downward projections 3ᵃ and 3ᵇ, and a central internally screw threaded projection or T leg 3ᶜ. This T leg is received upon the screw threaded end 12ᵃ of a stud 12, and when screwed in position a pin should be passed through the perforation 3ᵈ, so that the locking member 3, or T cannot be removed.

The stud 12, is a length sufficient to allow it to pass through the rim 20, and felly of the wheel. The main body of the stud 12, is screw threaded as shown at 12ᵇ, and upon this screw threaded portion and after the stud is passed through the felly of the wheel, I place an acorn locking nut 14. The outer end of the stud 12, is reduced and screw threaded as shown at 12ᶜ, and when the acorn nut 14, has been placed in position, I screw upon the reduced portion 12ᶜ, a flat key nut 13, by means of which the stud 12 and key 3, may be rotated, the key nut 13, should also be secured by a pin passing through the perforation 13ᵃ.

As previously stated one of the studs 12, is passed into each of the perforations 19ᵃ and 22ᵃ, and when revolved, one side of the key 3, will engage in the key way 10, but its movement therein will be limited by the stops 11, the stops check the movement of the key in the direction of rotation of the locking nut 14, and therefore the nut may be set up without fear of disturbing the locked relation of the key with the parts with which it engages.

At 9 and 9, in Fig. 4, I show blocks which engage upon the blocks 19 and 19, secured to the rim 20. These blocks 9 and 9, are secured to the removable rim 15, and are directly opposite and in position to engage the blocks 19 and 19. Each of the blocks 9 and 9, is provided with a tapered recess 9ᵃ, and each is also provided with the second half of a perforation 19ᵃ, which communicates with a key way 9ᵇ. A plan view of the blocks 9, is shown in Fig. 5, and in this figure I also show a plan view of blocks 18 and 21, four of which are adapted to engage upon the auxiliary blocks 7 and 7, and 8 and 8, which are secured to the permanent rim 20.

Upon the removable rim 15, I arrange a perforated block 16, through which the valve stem is free to pass. and the inner or free surface of this block is rounded so that it may engage and swing in the recess 1ᵇ of the block 1, shown in Fig. 1. Directly opposite this block 16, is a block 17, tapered and adapted to fit closely upon the block 22, and this block is also provided with a key way. It will be noted that all of these blocks are so machined and tapered that when the block 16, is engaged in the aperture 1ᵇ, and the valve stem passes through the thimble 2, the opposite side of the rim may be swung into position by a partially rotatable movement with the block 16, as the axis of the arc of rotation. When in this position and with the keys fitted and provided as described, each key is turned a quarter revolution or until the flat side of the key nut 13, is parallel with the sides of the felly of the wheel. This movement will bring one projection of each T member against its stop 11, then the acorn nuts 14, may be turned into engagement with the thimbles 2, and the rim will be secured in operative position. To remove the rim, the reverse of this operation will release the removable rim by turning the projections of the T member into a line with the adjacent edges of the blocks engaged thereby and the rim may be readily removed by drawing outward that portion directly opposite the valve stem.

For the purpose of symmetry, I provide an acorn nut for the valve stem, this nut also serves an important purpose of securing the valve stem against movement.

Although I have shown only four locking members, and although I believe that four such members are sufficient there is no reason why a greater number could not be supplied or why a lesser number could not be made to operate satisfactorily. I also employ every known mechanical means for improving the appearance of my device, tapering the outer edges of the blocks, so that they will conform to the relative shape of the felly, and the removable rim. A rim of any design may be used with my device, either a straight side, a clencher or one of any other construction. Modifications may be made within the scope of the appended claims without departing from the principle or sacrificing the advantages of the invention. I desire, however, that the principle of construction wherein the rim is drawn to the axial center of the wheel, and is supported at numerous points upon the periphery of the wheel be continued throughout the use of my invention.

Having carefully and fully described my invention what I claim and desire to secure by Letters Patent is:—

1. A device of the character described including a plurality of tapered blocks secured to the felly of a wheel each said block being provided with a keyway and a T shaped key adapted to pass through said felly and to be rotatably engaged in said keyway.

2. A lock for rims comprising a plurality of blocks each provided with one-half of a circular keyway and a key having a center post and two projecting arms adapted to be rotated and engaged into the two parts of said keyway to lock said blocks together.

3. A lock for rims comprising a plurality of similarly tapered blocks secured to said rim and to a felly each said block being provided with a portion of a keyway, a key passing through and rotatable in said felly, said key having a key shaped inner portion and a locking nut and flattened operating nut, said nuts comprising means for rotating said key shaped portion into said keyway and for retaining it therein and a stop within said keyway for limiting the movement of said key shaped portion.

THEODORE HEINZERLING.